US008559049B2

(12) United States Patent
Suzuki

(10) Patent No.: US 8,559,049 B2
(45) Date of Patent: Oct. 15, 2013

(54) PRINTING APPARATUS, LENS SHEET, AND PRINTING METHOD

(75) Inventor: Katsuhito Suzuki, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 746 days.

(21) Appl. No.: 12/496,700

(22) Filed: Jul. 2, 2009

(65) Prior Publication Data
US 2010/0002205 A1 Jan. 7, 2010

(30) Foreign Application Priority Data
Jul. 2, 2008 (JP) .................................. 2008-173109

(51) Int. Cl.
*G06K 15/00* (2006.01)
(52) U.S. Cl.
USPC .......................................................... 358/1.18
(58) Field of Classification Search
USPC ................................................ 358/1.18, 1.15
See application file for complete search history.

(56) References Cited

U.S. PATENT DOCUMENTS

| 5,812,152 | A | * | 9/1998 | Torigoe et al. .................... 347/2 |
| 6,343,186 | B1 | * | 1/2002 | Katsura et al. ................... 396/6 |
| 2004/0135780 | A1 | * | 7/2004 | Nims ............................ 345/419 |
| 2007/0206084 | A1 | | 9/2007 | Suzuki et al. |

FOREIGN PATENT DOCUMENTS

| CN | 101017212 A | 8/2007 |
| JP | 08-137034 | 5/1996 |
| JP | 3471930 B2 | 12/2003 |
| JP | 2006-293035 A | 10/2006 |
| JP | 2008-015394 A | 1/2008 |

* cited by examiner

*Primary Examiner* — Saeid Ebrahimi Dehkordy
(74) *Attorney, Agent, or Firm* — Nutter McClennen & Fish LLP; John J. Penny, Jr.; Christina M. Sperry

(57) ABSTRACT

Provided is a printing apparatus for performing printing on a lens sheet on which a plurality of lenses is arranged with a longitudinal direction thereof in one direction, and a print image corresponding to a plurality of parallaxes is formed on one surface thereof. A test pattern configured to provide different visibility to a user's eye is formed on any portion of the lens sheet, with a longitudinal direction thereof in a direction crossing the one direction. A position correction amount is calculated in order to form the print image on the lens sheet based on the visibility of the test pattern input by a user, and printing is executed for the forming of the print image based on combined image data created from a plurality of original image data and the position correction amount so that the position correction amount is reflected in the print image.

8 Claims, 15 Drawing Sheets

FIG. 8

| ID | RIGHT EYE | LEFT EYE | POSITION CORRECTION AMOUNT (μm) |
|---|---|---|---|
| T1 | RED | BLUE | -211.50 |
| T2 | RED | TWO COLORS OF BLUE AND RED, OR WHITE | -176.25 |
| T3 | RED | RED | -141.00 |
| T4 | TWO COLORS OF RED AND GREEN, OR WHITE | RED | -105.75 |
| T5 | GREEN | RED | -70.50 |
| T6 | GREEN | TWO COLORS OF RED AND GREEN, OR WHITE | -35.25 |
| T7 | GREEN | GREEN | 0 |
| T8 | TWO COLORS OF GREEN AND BLUE, OR WHITE | GREEN | 35.25 |
| T9 | BLUE | GREEN | 70.50 |
| T10 | BLUE | TWO COLORS OF GREEN AND BLUE, OR WHITE | 105.75 |
| T11 | BLUE | BLUE | 141.00 |
| T12 | TWO COLORS OF BLUE AND RED, OR WHITE | BLUE | 176.25 |

| TEST PATTERN IS PRINTED NEAR FRONT END OF SHEET | | | | TEST PATTERN IS PRINTED NEAR REAR END OF SHEET | | |
|---|---|---|---|---|---|---|
| ID | RIGHT EYE | LEFT EYE | ⇧ | ID | RIGHT EYE | LEFT EYE |
| T9 | BLUE | GREEN | | T5 | GREEN | RED |
| ⋮ | ⋮ | ⋮ | | ⋮ | ⋮ | ⋮ |

PRINTING APPARATUS, LENS SHEET, AND PRINTING METHOD

Priority is claimed under 35 U.S.C §119 to Japanese Application No. 2008-173109 filed on Jul. 2, 2008, which is hereby incorporated by reference in its entirety.

BACKGROUND

1. Technical Field

The present invention relates to a printing apparatus, a lens sheet, and a printing method.

2. Related Art

There is known a technique that forms a print image on a lenticular lens having a number of cylindrical convex lenses (hereinafter, referred to as convex lenses) arranged in parallel, thereby realizing a stereoscopic vision when the print image is observed through the convex lenses. In order to realize such a print image, predetermined image processing is performed on the image data corresponding to the left and right eyes of humans, thereby creating image data for stereoscopic vision. When printing is performed based on the image data, a print image for stereoscopic vision is formed on a lens sheet.

In the stereoscopic image data, subdivided image data for visual observation by either the left and right eyes are alternately arranged. Therefore, when the print image is formed on the lens sheet, it is necessary to match the phases (the positional relationship between the convex lenses and the subdivided image data) of the convex lenses and the print image. If a deviation in the phase (position) occurs between the convex lenses and the print image, the print image may not be visible from directly in front of the lens sheet, but may only be visible in a slightly inclined state, thereby making it difficult for a user to visually perceive the picture. Moreover, if the picture is viewed at positions different from the optimum position through the convex lens, the picture may be distorted and thus the quality will be poor.

When the lens sheet is fabricated, the cutting positions in the width direction of the convex lenses at the periphery differ from time to time. For this reason, it is necessary to perform phase matching between the convex lens and the print image for each lens sheet. As a method for solving such a phase matching problem, for example, a technique is disclosed in JP-B-3471930.

According to the technique disclosed in JP-B-3471930, a plurality of identification images spaced at varying intervals are printed on a margin area of a lens sheet. However, in this technique, a user needs to determine or select the optimum one from the plurality of identification images through visual observation. Therefore, a lot of time must be spent observing and determining if there are many identification images.

SUMMARY

An advantage of some aspects of the invention is that it provides a printing apparatus, a lens sheet, and a printing method, capable of performing phase matching between a convex lens and a print image in a simple manner.

According to an aspect of the invention, there is provided a printing apparatus for performing printing on a lens sheet on which a plurality of lenses is arranged in a longitudinal direction thereof which being set in one direction, and a print image corresponding to a plurality of parallaxes is formed on one surface thereof, wherein a test pattern configured to provide different visibility to a user's left and right eyes is formed on any portion of the lens sheet with a longitudinal direction thereof being set in a direction crossing the one direction, the printing apparatus including: position correction amount-calculation means for calculating a position correction amount for forming the print image on the lens sheet based on the visibility of the test pattern input by a user; and print execution means for executing printing in order to form the print image based on the combined image data created from a plurality of original image data and the position correction amount so that the position correction amount is reflected in the print image.

According to the described configuration, when the visibility of the test pattern, where the longitudinal direction crosses the arrangement direction of the lenses, in the user's left and right eyes is input by the user, the position correction amount based on the input visibility for forming the print image on the lens sheet is calculated by the position correction amount-calculation means. Moreover, the printing is executed on the lens sheet based on the combined image data and the position correction amount so that the position correction amount is reflected thereon. In this way, the print image having the position correction amount reflected thereon is printed on the lens sheet. Therefore, it is possible to perform phase matching (position correction) between the lens and the print image in a simple manner.

In the above-described aspect of the invention, the test pattern may be configured such that a plurality of color areas of different colors is arranged in a predetermined order in one of the lenses.

According to the described configuration, since a plurality of color areas of different colors is arranged in a predetermined order in one lens, if a positional deviation occurs, colors may appear differently in the user's left and right eyes. Therefore, it is possible to perform phase matching (position correction) between the lens and the print image in a simple manner based on the visibility of colors in the user's left and right eyes.

In the above-described aspect of the invention, the position correction amount-calculation means may include a position correction amount table in which the visibility of colors measured in advance and the position correction amounts are stored in a correlated manner, and may calculate the position correction amount based on the position correction amount table.

According to the described configuration, it is possible to calculate the corresponding position correction amount from the visibility of colors in the user's left and right eyes in a simple manner.

In the above-described aspect of the invention, the lens sheet may have a first print area for printing the print image thereon and a second print area for forming the test pattern thereon, and the position correction amount-calculation means may cause the test pattern to be printed on the second print area in such a state where the second print area is positioned closer to the upstream side in the direction of feeding the lens sheet than the first print area, the state being identical to the arrangement when the print image is printed on the first print area.

According to the described configuration, the test pattern is formed on the second print area by the printing operation of the printing apparatus, and the printing of the test pattern is performed in the same direction as the direction for printing the print image. Therefore, the visibility of colors in the user's left and right eyes can be reflected in the position correction amount when the print image is printed without requiring any processing.

In the above-described aspect of the invention, the lens sheet may have a first print area for printing the print image thereon and a second print area for forming the test pattern thereon, and the position correction amount-calculation means may cause the test pattern to be printed on the second print area in a state where the second print area is positioned closer to the downstream side in the direction of feeding the lens sheet than the first print area, the state being different from the arrangement when the print image is printed on the first print area.

According to the described configuration, the test pattern is formed on the second print area by the printing operation of the printing apparatus, and the printing of the test pattern is performed in a direction different from the direction for printing the print image. In this case, the second print area arrives at an ink landing position earlier than the first print area, and the first print area is pinched by a transport roller or the like in a state of being positioned on the upstream side. Therefore, compared with the case of printing the test pattern on the second print area in the same arrangement as when printing the print image on the first print area, it is possible to decrease the longitudinal dimension of the second print area.

In the above-described aspect of the invention, the position correction amount table may store the state where the test pattern is printed in the state where the second print area is positioned closer to the upstream side in the direction of feeding the lens sheet than the first print area, and the state where the test pattern is printed in the state where the second print area is positioned closer to the downstream side in the direction of feeding the lens sheet than the first print area, in a correlated manner.

According to the described configuration, even when the test pattern is printed in the state where the second print area is positioned closer to the downstream side in the direction of feeding the lens sheet than the first print area, although such an arrangement is different from the arrangement when the print image is printed on the first print area, the position correction amount table is able to correlate such an arrangement with the arrangement when the print image is printed on the first print area. Therefore, it is possible to perform phase matching (position correction) between the lens and the print image in an effective manner.

In the above-described aspect of the invention, the printing apparatus may further include combined image data creation means for creating the combined image data on the basis of the plurality of original image data, where the combined image data creation means may add or remove pixels in the combined image data by an amount corresponding to the position correction amount calculated by the position correction amount-calculation means.

According to the described configuration, by adding or removing pixels in the combined image data by the amount corresponding to the position correction amount, it is possible to perform phase matching (position correction) between the lens and the print image in an accurate manner.

According to another aspect of the invention, there is provided a lens sheet including: a first print area on which a plurality of lenses is arranged with a longitudinal direction thereof in one direction, and a print image corresponding to a plurality of parallaxes is formed on one surface thereof; a second print area on which the plurality of lenses is arranged to be continuous to the first print area, and a test pattern is formed which is configured to provide different visibility to a user's left and right eyes; and a tear-off line provided along the boundary of the first print area and the second print area so as to tear off the second print area from the first print area.

According to the described configuration, since the test pattern is formed on the second print area, it is possible to perform phase matching (position correction) based on the test pattern. Moreover, the test pattern can be torn off from the first print area because of the presence of the tear-off line. Therefore, after the phase matching (position correction) is completed, the second print area, having the unnecessary test pattern formed thereon, can be torn off.

In the above-described aspect of the invention, the identification means for enabling the identification of the direction of the feeding of the lens sheet may be formed in the first print area or the second print area.

According to the described configuration, because of the presence of the identification means, the user is prevented from setting the lens sheet on the printing apparatus in a wrong direction. As a result, it is possible to prevent the print image from being formed in the wrong direction and to prevent a waste of a lens sheet.

According to a further aspect of the invention, there is provided a printing method for performing printing on a lens sheet on which a plurality of lenses is arranged in a longitudinal direction thereof in one direction, and a print image corresponding to a plurality of parallaxes is formed on one surface thereof, wherein a test pattern configured to provide different visibility to a user's left and right eyes is formed on any portion of the lens sheet, with a longitudinal direction thereof being set in a direction crossing the one direction, the printing method including: a step for calculating the position correction amount for forming the print image on the lens sheet based on the visibility of the test pattern input by a user; a step for creating combined image data for creating combined image data in order to form the print image based on a plurality of original image data; and a print execution step for executing printing in order to form the print image based on the combined image data and the position correction amount so that the position correction amount is reflected in the print image.

According to the described configuration, when the visibility of the test pattern, where the longitudinal direction crosses the arrangement direction of the lenses, in the user's left and right eyes is input by the user, the position correction amount based on the input visibility for forming the print image on the lens sheet is calculated in the step for calculating the position correction amount. Moreover, the printing is executed on the lens sheet on the basis of the combined image data and the position correction amount so that the position correction amount is reflected thereon. In this way, the print image having the position correction amount reflected thereon is printed on the lens sheet. Therefore, it is possible to perform phase matching (position correction) between the lens and the print image in a simple manner.

BRIEF DESCRIPTION OF THE DRAWINGS

The invention will be described with reference to the accompanying drawings, wherein like numbers reference like elements.

FIG. 8 is a diagram illustrating an example of a position correction amount table.

FIG. 13 is a diagram illustrating a modification of the position correction amount table.

DESCRIPTION OF EXEMPLARY EMBODIMENTS

Hereinafter, a printing apparatus 11 according to exemplary embodiments of the invention will be described with reference to FIGS. 1 to 10. In the descriptions below, the printing apparatus 11 is configured to include a printer 10 (corresponding to means for print execution) and a computer 130.

Lens Sheet

Figure 1:
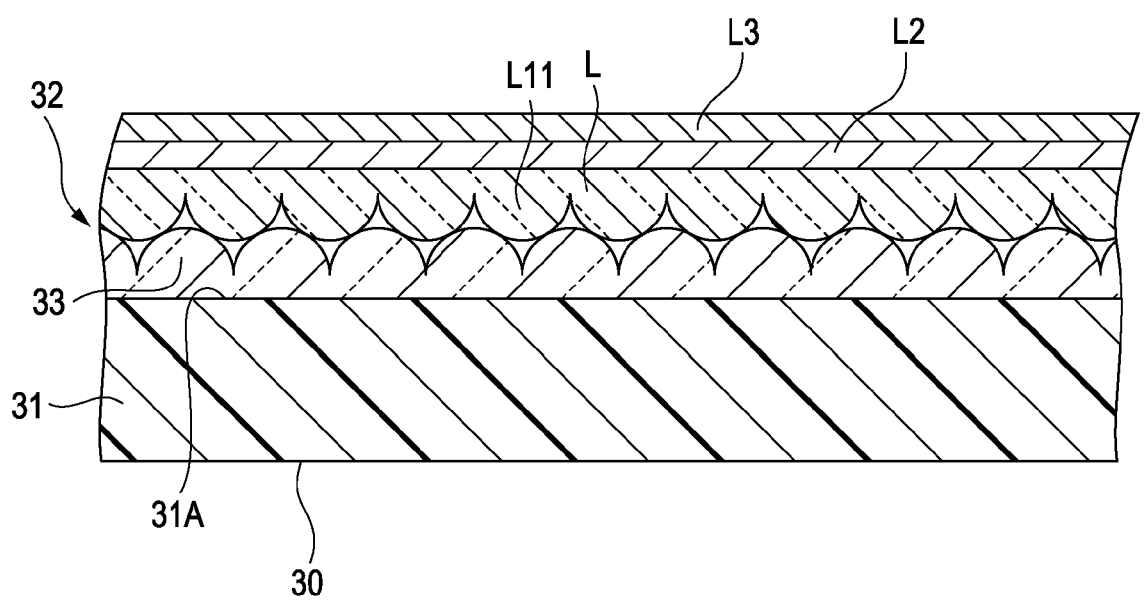
FIG. 1 is a sectional view illustrating the structure of a sheet guide and a lens sheet according to an embodiment of the invention.

First, the description of a lens sheet L as a printing medium will be provided. As illustrated in FIG. 1, the lens sheet L includes a lenticular lens L1 positioned on a front surface, an ink absorbing layer L2 provided which is in contact with a back surface of the lenticular lens L1, and an ink transmitting layer L3 positioned on a back surface of the lens sheet L. The lenticular lens L1 has a structure in which a plurality of cylindrical convex lenses (convex lenses L11) is arranged at regular pitches in parallel to each other with a longitudinal direction thereof in one direction. In the lenticular lens L1, the curvatures of the convex lenses L11 are preferably set so that the focal point of light which passes through the respective convex lenses L11 is positioned on the back surface of the lenticular lens L1.

The ink transmitting layer L3 is a portion where droplets of ink ejected from non-illustrated nozzles are first stuck and then through which the stuck ink is transmitted. The ink transmitting layer L3 is formed of materials such as fine particles of oxidized titanium, silica gel, and PMMA (methacrylic resin), barium sulfate, glass fiber, or plastic fiber. The ink absorbing layer L2 is a portion where the ink transmitted through the ink transmitting layer L3 is absorbed and/or fixed. The ink absorbing layer L2 is formed of materials such as hydrophilic polymer resin of PVA (polyvinyl alcohol), cation compound, or fine particles of silica. The lenticular lens L1 are formed of materials such as PET, PETG, APET, PP, PS, PVC, acryl or UV resin.

The ink absorbing layer L2 is a transparent member and the ink transmitting layer L3 is a member having a white color. However, the ink absorbing layer L2 may be a member having a white color and the ink transmitting layer L3 may be a transparent member. Moreover, both the ink absorbing layer L2 and the ink transmitting layer L3 may be transparent members. In this embodiment, because of the presence of the ink transmitting layer L3, it is possible for a user to touch the lens sheet L right after printing. However, the lens sheet L may be configured without the ink transmitting layer L3.

As illustrated in FIG. 1, the lens sheet L according to the present embodiment has a generally rectangular shape, and the edge portions of the lens sheet L constituting the general rectangular shape are parallel with the longitudinal direction of the convex lenses L11.

Figure 2:
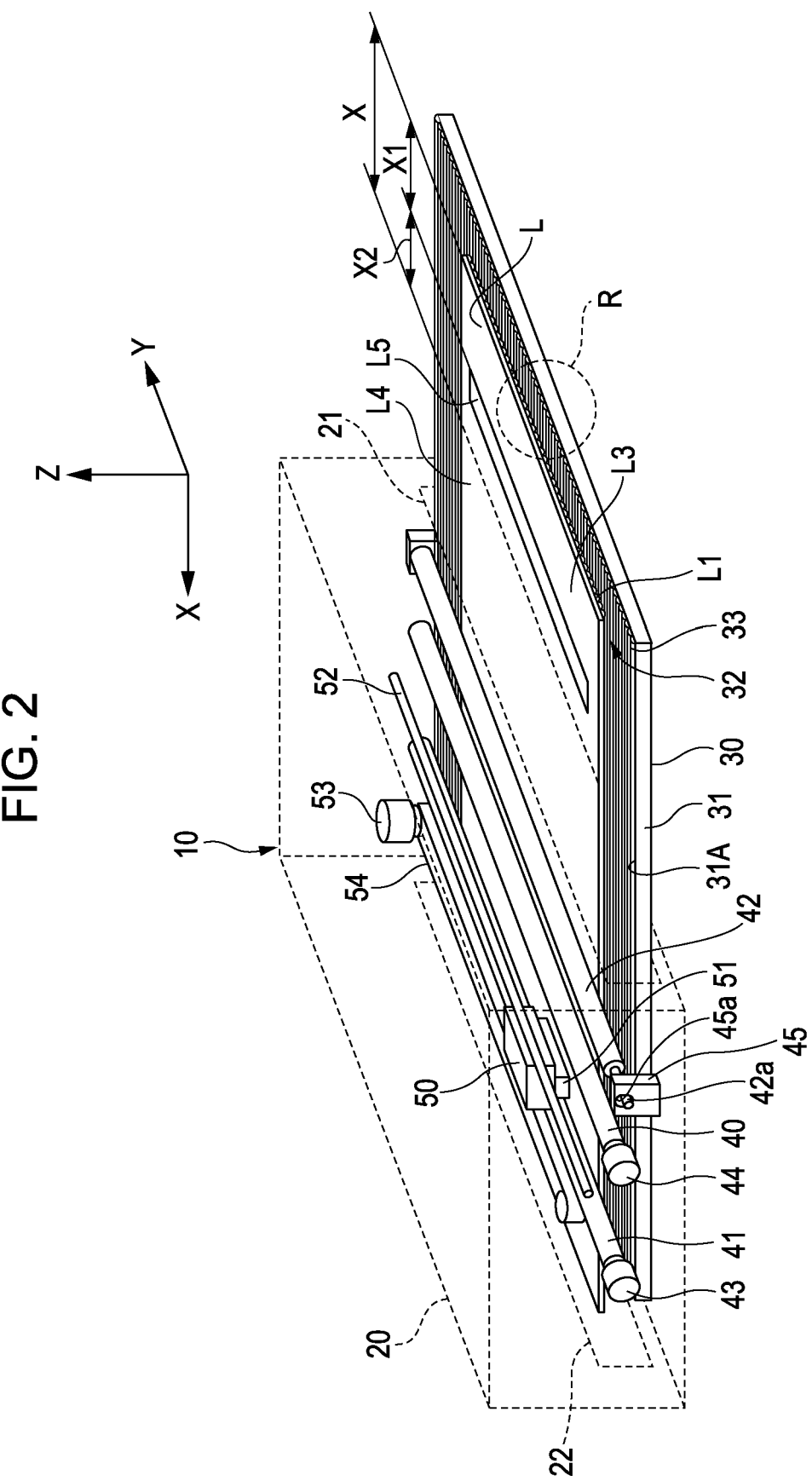
FIG. 2 is a perspective view of the rear of a printer.
Figure 3:
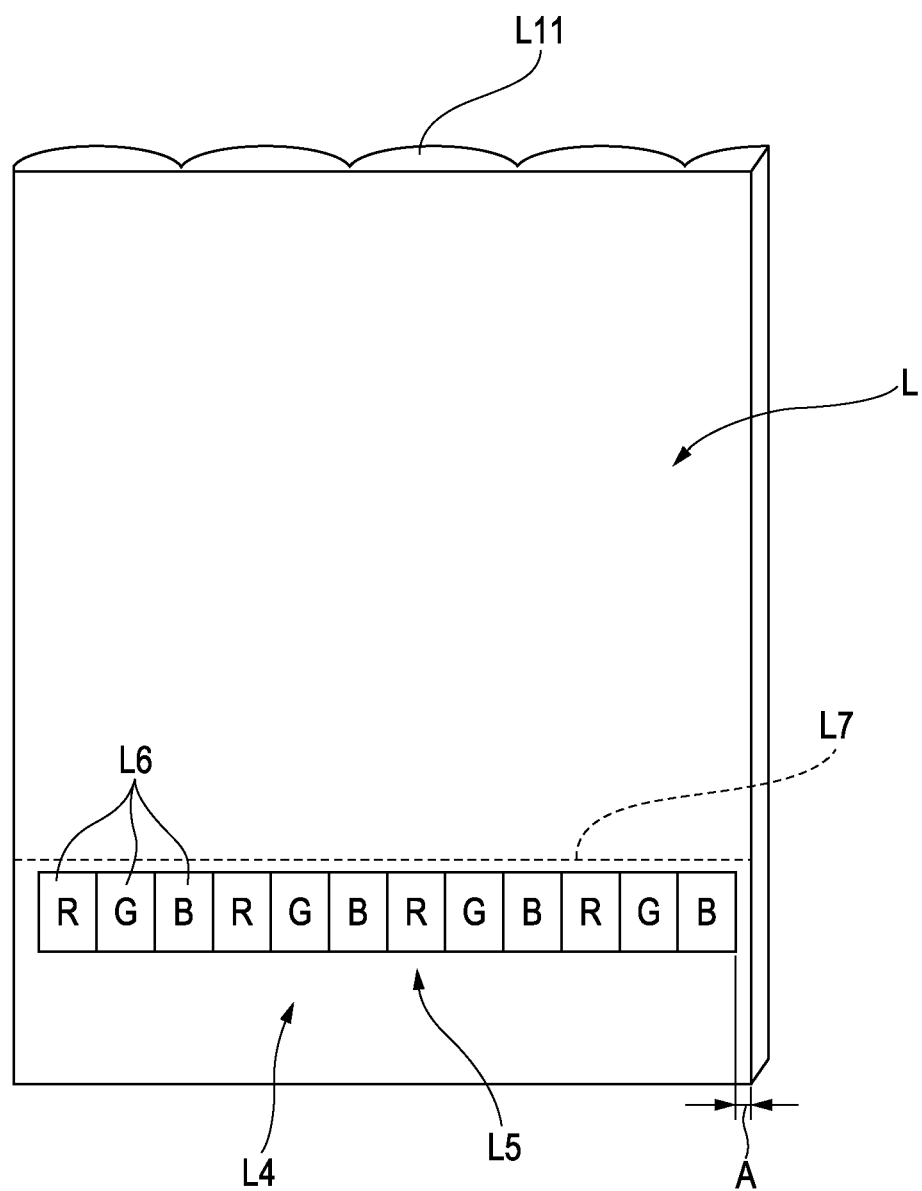
FIG. 3 is a plan view illustrating a printing surface of the lens sheet.

As illustrated in FIG. 2, the lens sheet L according to the present embodiment includes a margin area L4a (corresponding to a second print area). The margin area L4a is an area on which printing is not actually performed. A test pattern L5 is printed on the margin area L4a. As illustrated in FIG. 3, a print image-forming area L4b (corresponding to a first print area) on which a print image is formed is provided above the margin area L4a.

Figure 4:
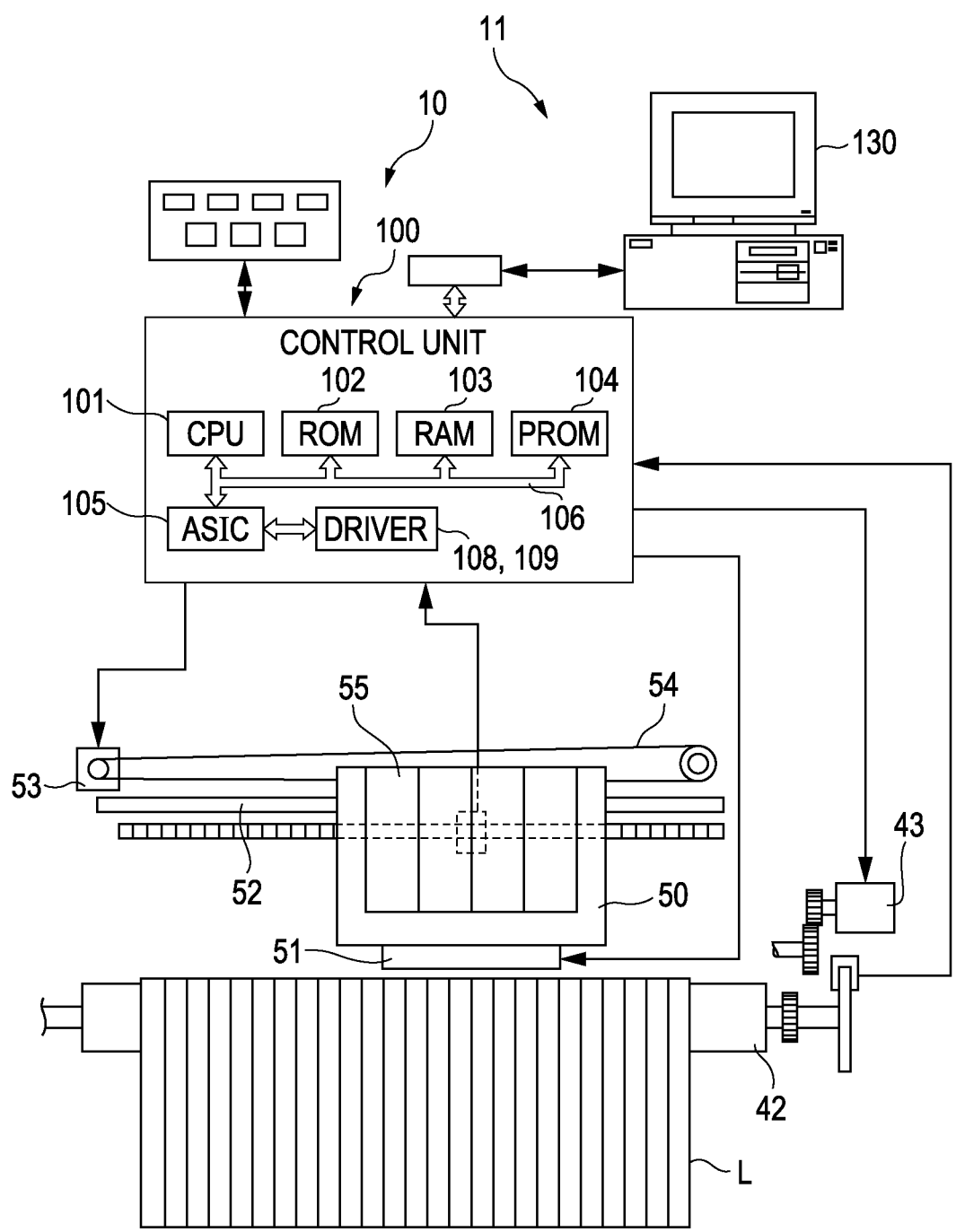
FIG. 4 is a schematic view illustrating the structure of the printer.

The test pattern L5 formed on the margin area L4a is formed as a color pattern comprising of a plurality of color areas L6. Specifically, as illustrated in FIG. 4, the test pattern L5 is constructed of red, green, and blue (in FIG. 3, the colors red, green, and blue are represented by R, G, and B, respectively), the color areas L6 with different colors. The test pattern L5 is configured such that each of the convex lenses L11 is able to transit to the different color areas L6 along the width direction of each of the convex lens L11.

It is preferable to print the above-described test pattern L5 in the step of manufacturing the lens sheet L, whereby the user's burden can be reduced. The printing of the test pattern L5 in the step of manufacturing the lens sheet L can be performed using the printer 10 as illustrated in FIG. 2. The test pattern L5 is arranged in the direction perpendicular to the longitudinal direction of the convex lenses L11. However, the test pattern L11 may be arranged not only in the direction perpendicular to the longitudinal direction of the convex lenses L11, but also in the direction crossing the longitudinal direction of the convex lenses L11, but not perpendicular thereto.

A tear-off line L7 is provided in the lens sheet L. The tear-off line L7 serves to divide the lens sheet L into the print area and the margin area L4a, and serves as a reference line along which the margin area L4a is torn off from the print area after the print image is printed on the print area of the lens sheet L.

When printing the test pattern L5 using the printer 10 as illustrated in FIG. 2, the length of the margin area L4a in the sheet feeding direction, namely the length X1 between the upstream-side end of the lens sheet L and the upstream-side end of the test pattern L5, is preferably set so that the upstream-side end of a print head 51 reaches the printing portion on the upstream side of the test pattern L5 in a state where the lens sheet L is pressed by a sheet pressing roller 42. Moreover, an addition of the length X1 and the length X2 (the length X2 of the print area), the length from the tear-off line L7 to the upstream-side end of the test pattern L5, corresponds to the length X of the margin area L4a. By doing so, it is possible to make sure that the lens sheet L is pressed by the sheet pressing roller 42 not only when an actual picture (the print image) is printed but also when the test pattern L5 is printed. By making sure that the lens sheet L is pressed by the sheet pressing roller 42 even when the test pattern L5 is printed, it is possible to improve the accuracy of the transport angle during printing, thereby guaranteeing accuracy.

General Configuration of Printer 10

FIG. 2 is a perspective view of the rear of the printer 10, illustrating the schematic configuration of the printer 10. In FIG. 2, the direction indicated by the arrow X, which is the moving direction of the lens sheet L as a printing medium, will be referred to as the forward direction (front side), and the opposite direction will be referred to as the backward direction (rear side). Moreover, the direction indicated by the arrow Y, which is the right-hand direction from the rear side to the front side, will be referred to as the rightward direction (right side), and the opposite direction, which is the left-hand direction, will be referred to as the leftward direction (left side). Furthermore, the direction indicated by the arrow Z will be referred to as the upward direction (upper side), and the opposite direction will be referred to as the downward direction (lower side).

The printer 10 includes a casing 20 as an outer body, a sheet guide 30 for supporting the lens sheet L from the lower side, a sheet feeding roller 40 and a sheet discharging roller 41 for transporting the lens sheet L mounted on the sheet guide 30 from the rear side to the front side, the sheet pressing roller 42 for pressing the lens sheet L toward the sheet guide 30, and the print head 51 for performing printing on the lens sheet L.

The casing 20 is formed with a sheet feeding opening 21 on a rear side surface thereof, through which the lens sheet L is supplied into the casing 20, and is also formed with a sheet discharging opening 22 on a front side surface thereof, through which the lens sheet L supplied from the side of the sheet feeding opening 21 is discharged. The lens sheet L supplied to the printer 10 from the sheet feeding opening 21 is transported toward the forward side by the sheet feeding roller 40 and the sheet discharging roller 41, subjected to printing by the print head 51, and discharged to the outside of the printer 10 through the sheet discharging opening 22.

The sheet guide 30 is formed of a generally rectangular plate-like member and arranged on the lower side of the sheet feeding roller 40, the sheet discharging roller 41, and the sheet pressing roller 42. In the front-rear direction, the sheet guide 30 extends from a position backwardly protruded from the sheet feeding portion 21 to a position located between the sheet discharging portion 22 and the sheet discharging roller 41. In the horizontal direction, namely, the width direction thereof, the sheet guide 30 has a width capable of supporting the mounted lens sheet L over the entire width thereof. The sheet guide 30 is attached to the casing 20 or a structure such as an inner frame by a non-illustrated mechanism.

The sheet guide 30 includes a board 31 and an engagement portion 32. The board 31 is a plate-like member formed of resin or the like, and the same member as the lenticular lens L1 is bonded to a top surface 31A thereof. As a result of this bonding, the engagement portion 32 is formed. In this embodiment, the engagement portion 32 has the same shape as the lenticular lens L1 of the lens sheet L. That is to say, protrusions 33 having the same shape as the convex lenses L11 of the lenticular lens L1 are arranged at the same pitch as the arrangement pitch of the lenticular lens L1 over a width wider than the width of the lens sheet L. Moreover, the longitudinal direction of the protrusions 33 extends along a predetermined transport direction of the lens sheet L, namely, along the direction perpendicular to the sheet feeding roller 40 and the sheet discharging roller 41.

Although the engagement portion 32 is formed of the same member as the lenticular lens L1, when the board 31 is formed by resin molding, the engagement portion 32 may be formed so as to be integral with the board 31 by forming in advance a molding surface corresponding to the engagement portion 32 in the mold. When the electrophotographic printer engine 32 is integrated into the board 31 by resin molding, a low-friction resin material such as fluorine resin may be used as a resin material for forming the board 31 to reduce the friction between the lens sheet L and the engagement portion 32, so that the lens sheet L can be smoothly transported. The board 31 may be formed of a metallic plate. In this case, the engagement portion 32 may be formed by applying cutting processing to the metallic plate.

The sheet feeding roller 40 and the sheet discharging roller 41 are respectively arranged at positions before and after the print head 51. The sheet feeding roller 40 and the sheet discharging roller 41 are respectively rotated by a sheet feeding motor 43 and a sheet discharging motor 44, and are configured to transport the lens sheet L mounted on the sheet guide 30 from the rear side to the front side. The sheet feeding roller 40 and sheet discharging roller 41 are provided to be longitudinally longer than the width of the lens sheet L, and configured to uniformly press the lens sheet L against the engagement portion 32 over a wide range, so that the lenticular lens L1 and the engagement portion 32 can be more firmly engaged.

A thick rubber member having elastic properties may be coated around the sheet feeding roller 40 and the sheet discharging roller 41. By doing so, the surfaces of the sheet feeding roller 40 and the sheet discharging roller 41 can be elastically change shape. Moreover, the distance between the sheet feeding roller 40 and the sheet guide 30 and the distance between the sheet discharging roller 41 and the sheet guide 30 are configured to be smaller than the thickness of the lens sheet L, so that the lens sheet L is pressed against the sheet guide 30 by the sheet feeding roller 40 and the sheet discharging roller 41.

The sheet pressing roller 42 is disposed at a position closer to the upstream side (or downstream side) than the sheet feeding roller 40. The sheet pressing roller 42 is formed of a metal such as stainless steel or brass and is provided to be longer than the width in the horizontal direction of the lens sheet L. The sheet pressing roller 42 is provided with shafts 42a on left and right end surfaces thereof, each of which has a diameter smaller than that of the portion of the sheet pressing roller 42 coming into contact with the lens sheet L.

Bearings 45 are disposed at both ends of the sheet pressing roller 42. Bearing holes 45a are formed in the bearings 45. The bearing holes 45a have a vertically long elliptical shape. The above-described shafts 42a are inserted into the bearing holes 45a. Therefore, the sheet pressing roller 42 is supported to be vertically movable with respect to the bearings 45.

When the lens sheet L is inserted between the sheet pressing roller 42 and the sheet guide 30, the sheet pressing roller 42 is raised upward because of the presence of the lens sheet L. That is to say, in a state where the shafts 42a of the sheet pressing roller 42 is supported on the lower ends of the bearing holes 45a, the distance between the sheet guide 30 and the sheet pressing roller 42 is set to be smaller than the distance between the top surface (the back surface: a surface close to the ink transmitting layer L3) of the lens sheet L mounted on the sheet guide 30 and the apex of the protrusions 33. Owing to this configuration, the lens sheet L transported on the sheet guide 30 is pressed against the sheet guide 30 by the sheet pressing roller 42.

When the lens sheet L is transported, the sheet pressing roller 42 rotates about the shafts 42a, following the transport of the lens sheet L. Moreover, the distance between the sheet feeding roller 40 and the sheet guide 30 and the distance between the sheet discharging roller 41 and the sheet guide 30 are set to such a distance that an appropriate pressing force is applied to the lens sheet L from these rollers.

The print head 51 is mounted on a lower surface of a carriage 50. In this embodiment, although the print head 51 is configured as an ink jet print head ejecting ink, other types of print heads (such as a gel jet type or a heat transfer type) may be used. The carriage 50 is movably supported to a carriage shaft 52 which is provided to extend in the horizontal direction, and is mounted on a timing belt 54 which is driven by a carriage motor 53. Owing to this configuration, when the timing belt 54 is rotated in the horizontal direction by the carriage motor 53, the print head 51 is moved in the horizontal direction along the carriage shaft 52. An ink cartridge 55 is removably mounted on the carriage 50.

When printing is performed on the lens sheet L with the above-described configuration, the lens sheet L, namely the side of the lenticular lens L1, is mounted on the engagement portion 32 of the sheet guide 30. By doing so, the convex lenses L11 of the lens sheet L and the protrusions 33 are engaged with each other, and the positioning of the lens sheet L in the horizontal direction (main scanning direction) is carried out by the engagement portion 32. Moreover, the longitudinal direction of the protrusions 33 extends in the transport direction (sub scanning direction) of the lens sheet L. Therefore, when the lens sheet L is transported, the lens sheet L is guided in the sub scanning direction by the engagement portion 32. In this way, the lens sheet L is transported in a state where the transport direction is constantly maintained.

Control Unit

Figure 5:
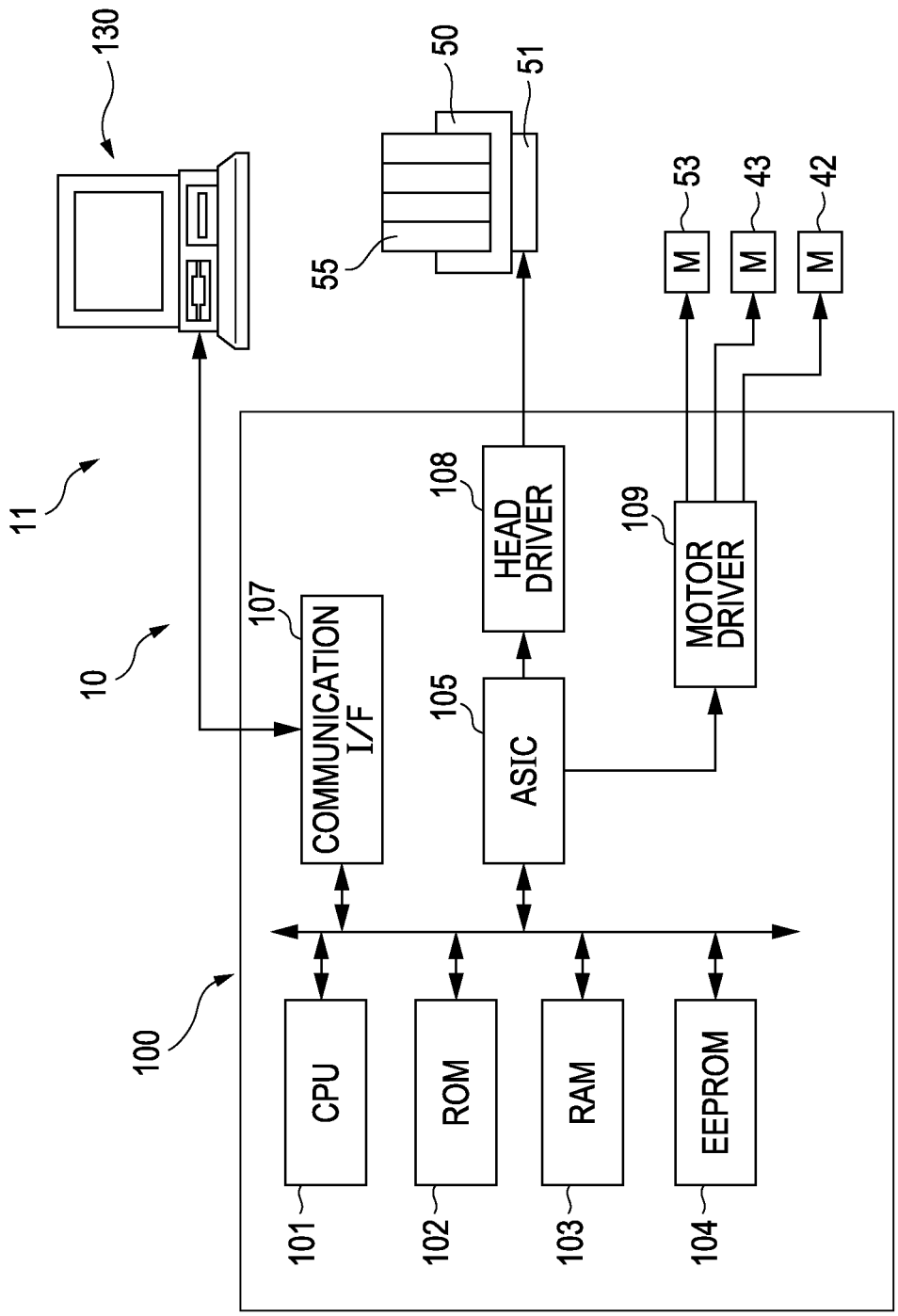
FIG. 5 is a block diagram illustrating a schematic configuration of a control unit.

As illustrated in FIGS. 4 and 5, a control unit 100 includes a CPU (Central Processing Unit) 101, a ROM (Read Only Memory) 102, a RAM (Random Access Memory) 103, an EEPROM (Electronically Erasable and Programmable ROM) 104, an ASIC (Application Specific Integrated Circuit) 105, a communication I/F 107, a head driver 108, a motor driver 109, and the like. These components are connected together via a transmission path 106 (FIG. 4) such as a bus so as to be able to transmit and receive data between them.

Among the above-described components, the CPU 101 performs various calculation processes in accordance with a program stored in the ROM 102 or the EEPROM 104. In the ROM 102, a control program for controlling the printer 10, data needed for processing, and the like are stored. The RAM 103 is a memory in which the CPU 101 temporarily stores a program in execution, data in the process of calculation, or the like. In addition, the EEPROM 104 is a memory for storing various types of data required to be maintained even after the printer 10 is turned off. In the ROM 102 or the EEPROM 104, the same program as the later-described printer driver program 134c is stored.

The ASIC 105 is a special-purpose IC for driving the print head 51 and various motors based on signals from various sensors not illustrated in the figure. The communication I/F 107 is connected to the computer 130 through a connector not illustrated in the figure and performs a communication process. Owing to this configuration, when the printer 10 receives a print signal PS from the computer 130, a printing process by the printer 10 is started based on the print signal PS.

The head driver 108 generates a predetermined voltage in accordance with a command from the ASIC 105 and applies the voltage to a piezoelectric element inside the print head 51. The motor driver 109 generates a predetermined voltage in accordance with the command from the ASIC 105 and applies the voltage to the respective motors 43, 44, and 53.

Schematic Configuration of Computer

Figure 6:
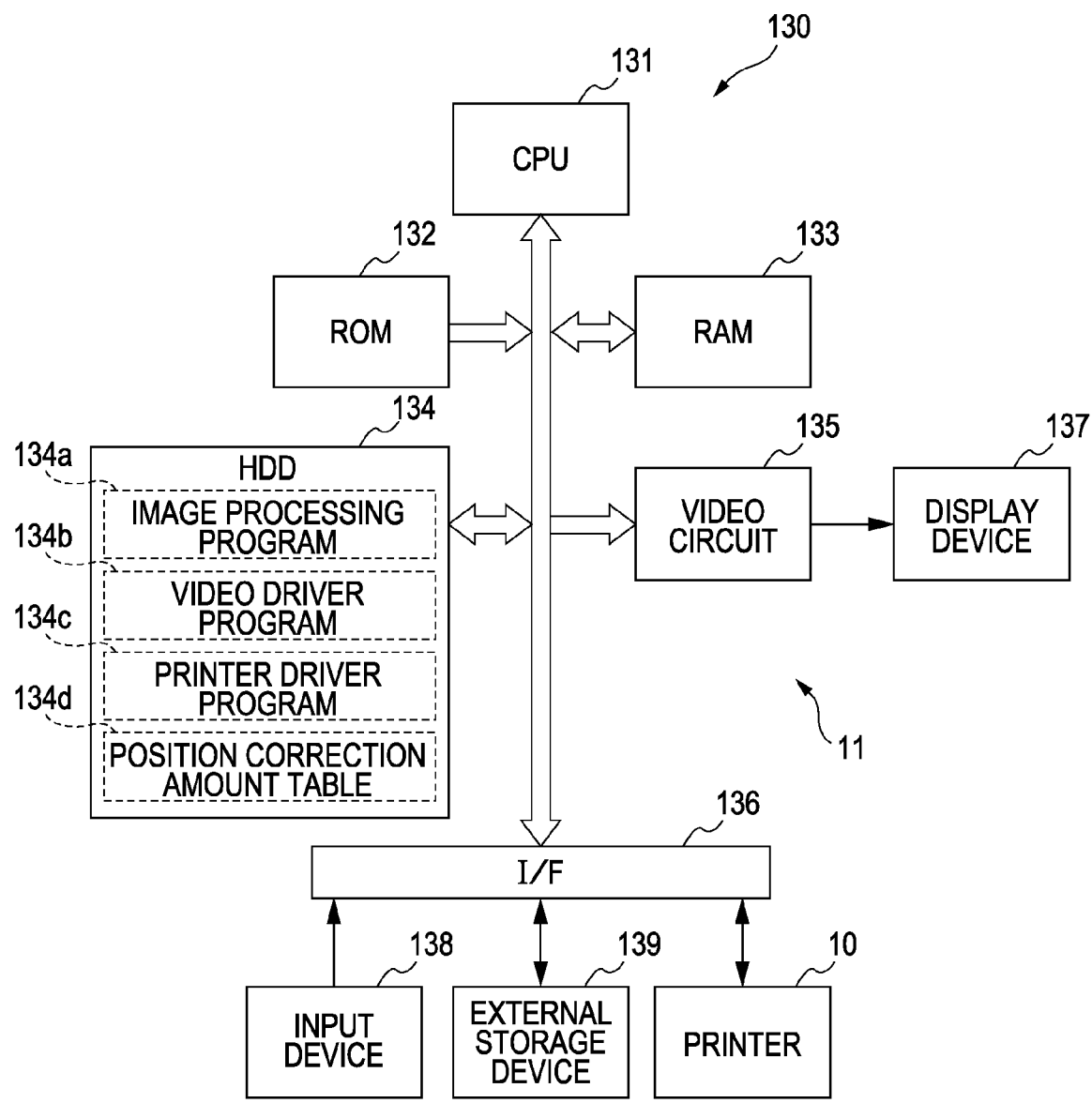
FIG. 6 is a block diagram illustrating a schematic configuration of a computer.

As illustrated FIG. 6, the printer 10 is connected to the computer 130 through the communication I/F 107. The computer 130 is configured to include a CPU 131, a ROM 132, a RAM 133, an HDD (Hard Disk Drive) 134, a video circuit 135, and an interface 136, a display device 137, and the like. Among these components, in the HDD 134, an image processing program 134a, a video driver program 134b, a printer driver program 134c, a position correction amount table 134d, and the like are stored.

The computer 130 corresponds to position correction amount-calculation means and combined image data creation means.

Among the above-described programs, the image processing program 134a is a program for processing an image so as to perform the printing of the lens sheet L. That is to say, the image processing program 134a performs the processing for creating image data (combined image data) in order to form a print image for stereoscopic vision on the lens sheet L, as described below.

Figure 7:
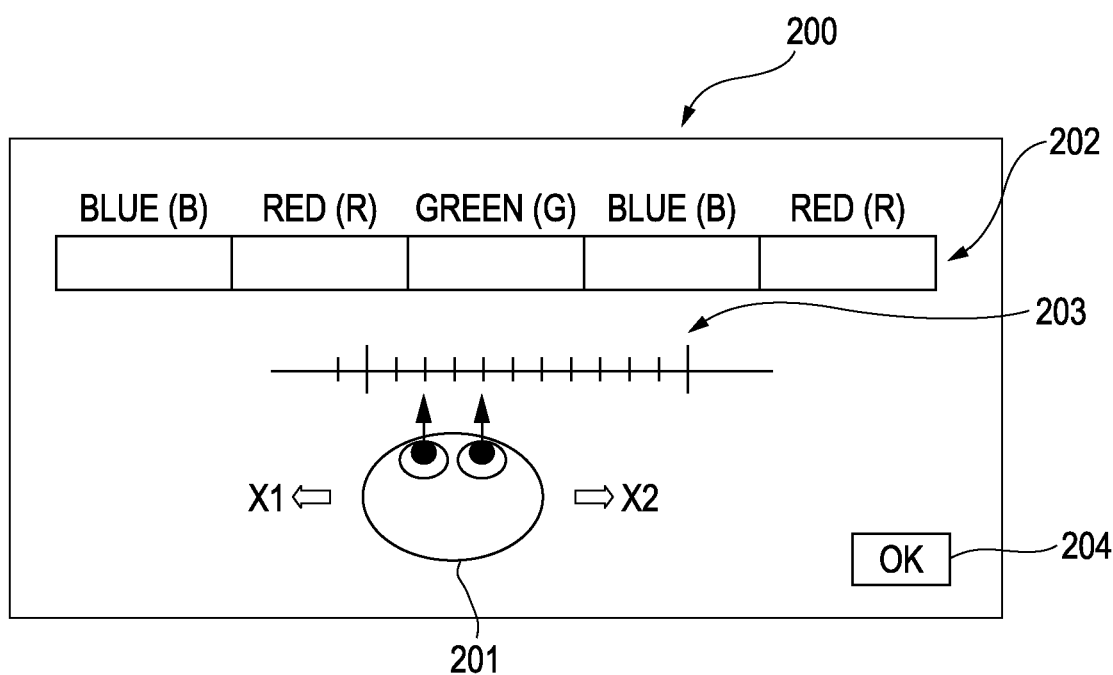
FIG. 7 is a diagram illustrating an example of a display window on which a user moves a cursor.

The image processing program 134a has a print function for printing the test pattern L5 as illustrated in FIG. 3 and the like on the lens sheet L, in cooperation with the printer driver program 134c. Moreover, the image processing program 134a displays a display window 200 as illustrated in FIG. 7, in cooperation with the video driver program 134b. Furthermore, the image processing program 134a has a function of operating a cursor 201 on the display window 200 based on the visibility of the test pattern L5 in the user's eyes, thereby achieving phase adjustment (position correction). In addition to the cursor 201, a test pattern display portion 202, scale marks 203, and an OK button 204 are displayed on the display window 200. The cursor 201 is movable in steps on the scale marks 203 by one scale mark in the directions indicated by X1 and X2.

When the cursor 201 is moved, the image processing program 134a performs the process of removing pixels of the combined image data or adding pixels of white or the like in accordance with the amount of movement.

If the printer driver program 134c is able to adjust the print start position on a one-pixel basis, the image processing program 134a and the printer driver program 134c may cooperate to perform the adjustment of the print start position on a one-pixel basis. In such a case, the process of removing the pixels from the combined image data or adding the white pixels or the like is not performed.

The video driver program 134b is a program for driving the video circuit 135, and is executed to generate a video signal and supply the video signal to the display device 137 for display, for example, after a gamma correction process, white balance adjustment, or the like is performed for the test image data supplied from the image processing program 134a.

The printer driver program 134c is run under the control of a predetermined operating system (OS), and is configured to perform a resolution conversion process on the combined image data created by the image processing program 134a, a color conversion process that converts the combined image data of an RGB color system into print data on a CMYK (Cyan, Magenta, Yellow, Black) color system, a half-tone process on the print data represented in the CMYK color system, and a rasterizing process. Then, the printer driver program 134c supplies a print signal PS to the printer 10.

As illustrated in FIG. 8, the position correction amount table 134d is a table representing the relationship between the combination of colors visible by a user's left and right eyes and the position correction amount corresponding to the combination. That is to say, when the cursor is moved on the display window 200 and the colors viewed by the user's left and right eyes are determined, the position correction amount is automatically calculated by the collaboration of the position correction amount table 134d and the image processing program 134a.

Specifically, the position correction amount table 134d calculates the position correction amount based on the width of the convex lens L11 of the lens sheet L in use and the number of scale marks per one convex lens L11 during the cursor movement on the display window 200 of FIG. 7. That is to say, assuming that the width of the convex lens L11 is 423 μm (60.05 lpi: lens per inch) and the number of scale marks per one convex lens L11 is 12 (i.e., the number of scale marks per one color is 4), when the cursor is moved by one scale mark, the position is corrected by 35.25 µm.

The test pattern L5 is comprised of a set of colors red (R), green (G), and blue (B) that repeats alternately, and one set of the color pattern is identical in length to the width of the convex lens L11, with green (G) being located at the center of the one set. Therefore, if green (G) is visible by both the user's left and right eyes, no positional deviation has occurred between the test pattern L5 and the convex lens L11, so the user does not need to move the cursor. For this reason, in the position correction amount table 134d illustrated in FIG. 8, the position correction amount is set to zero for ID (T5) corresponding to the case when green (G) is visible by both the user's left and right eyes.

The relationship between the signs (plus or minus) in the position correction amount table 134d described in relation to the position correction amount and the signs (plus or minus) of the scale marks 203 are set as per below. The left side in FIG. 7 is the minus side and the right side is the plus side, while the encircled portion in the scale marks 203 corresponds to the zero point. However, the plus-minus relationship may be reversed in FIG. 7.

The width (lens resolution) of the convex lens L11 illustrated in FIG. 1 and the like is set to 60.05 lpi, and the position correction amount table 134d illustrated in FIG. 8 stores therein the position correction amount corresponding to 60.05 lpi. However, the width (lens resolution) of the convex lens L11 is not limited to 60.05 lpi, and information stored in the position correction amount table 134d is not limited to the position correction amount corresponding to 60.05 lpi, but various modifications may occur.

Print Operation

The procedures of performing printing on the lens sheet L using the printing apparatus 11 having the above-described configuration will be described with reference to the flowchart of FIG. 9.

First, an operation of forming the test pattern L5 on the margin area L4a of the lens sheet L is performed (S01). In this case, when the lens sheet L is set on the printer 10, the margin area L4a is positioned on the upstream side in the sheet feeding direction. In such a state, the image processing program 134a is activated to issue an instruction to execute printing of the test pattern L5. Then, printing of the test pattern L5 as illustrated in FIG. 3 is performed. In printing of the test pattern L5, the print start position is set to a position located at a predetermined distance A from the end of the lens sheet L.

In the printer 10 illustrated in FIG. 2, the print start position of the print head 51 is set such that after the end of the lens sheet L or the like is detected by a non-illustrated sheet detection sensor or the like, printing is started at a non-home position. For this reason, a portion of the lens sheet L located at the distance A from the end close to the non-home position corresponds to the print start position of the test pattern L5.

If there is a plurality of lens sheets L of which the cut positions of the ends thereof with respect to the convex lens L11 are the same (i.e., the reproducibility is the same), it is necessary to print the test pattern L5 on only one lens sheet L. Moreover, if there is a lens sheet L in which the test pattern L5 is printed in advance on the margin area L4a, the operation of step S01 may be omitted and the next operation of step S02 can be subsequently performed.

Figure 10:
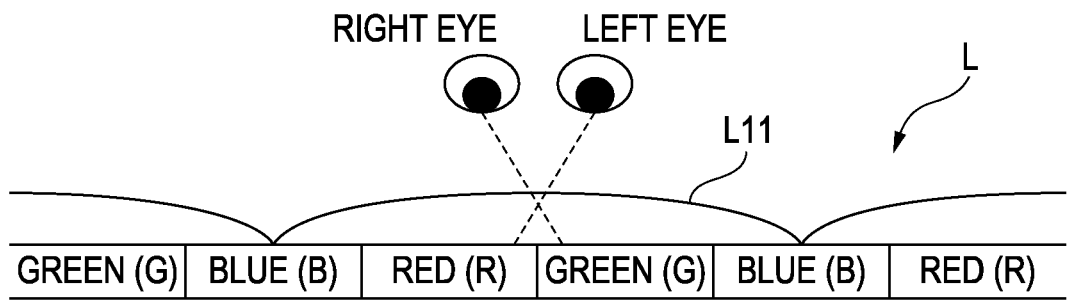
FIG. 10 is a diagram illustrating an image from which a user perceives a test pattern.

Next, the test pattern L5 formed on the margin area L4a is visually observed through the convex lens L11 as illustrated in FIG. 10. At this time, the test pattern L5 positioned in the front side is visually observed in a state where the margin area L4a is positioned on the lower side. The results of the visual observation are examined. When the test pattern L5 which changes in the order of red (R), green (G), and blue (B) from the left side in FIG. 3 is observed from the side of the convex lens L11 in comply with the width of the convex lens L11, the combination of the color of the test pattern L5 visible by the left eye and the color of the test pattern L5 visible by the right eye can be selected by moving the cursor 201 on the display window 200 in FIG. 7. For example, when green (G) is visible by the right eye, red (R), green (G), or a color at the boundary of red (R) and green (G) may be visible by the left eye. The color at the boundary of red (R) and green (G) may be two colors of red (R) and green (G), two colors of red (R) and the background color of the print surface, or two colors of green (G) and the background color of the print surface. The background color may be white or the transparent color of the convex lens L11.

If the user's visual recognition result is that red (R) and green (G) were visible by the left and the right eyes, respectively, then, the user moves the cursor 201 on the display window 200 so that the left and the right eyes are positioned so as to correspond to red (R) and green (G), respectively. Specifically, the cursor 201 illustrated in FIG. 7 is moved so that the ends of the arrows correspond to corresponding colors of the test pattern L5.

When the cursor adjustment by the user is completed (including the case where the cursor was originally positioned at the correct position and hence the user did not adjusted the cursor), the user clicks on the OK button 204 on the display window 200 in FIG. 7. Then, the computer 130 determines if the OK button was pressed (S02). If it is determined that the OK button was pressed (Yes), the image processing program 134a calculates a position correction amount by referring to the position correction amount table 134d based on the combination of colors visible by the left and right eyes, selected by the cursor 201 (S03). If the OK button 204 was not pressed in step S02, the operation of step S02 is performed again.

Subsequently, the image processing program 134a performs an operation of creating combined image data from the image data for the left eye and the image data for the right eye (S04). Specifically, the resolution of the respective image data in the main scanning direction is decreased by half. Then, image data of a stripe shape corresponding to one convex lens L11 is created with respect to each of the left-eye image data and the right-eye image data. The left-eye image data of a stripe shape and the right-eye image data of a stripe shape are arranged alternately, thereby creating the combined image data.

Next, phase adjustment (position correction) is performed (S05). That is to say, the image processing program 134a performs an operation of removing pixels from the combined image data or adding pixels of white or the like based on the position correction amount calculated in step S03.

More specifically, if the position correction amount determined by the position correction amount table 134d illustrated in FIG. 8 has a minus value, the combined image data is corrected so that a predetermined number of pixels corresponding to the width are deleted from the end side corresponding to the non-home position. Conversely, if the position correction amount has a plus value, the combined image data is corrected so that a predetermined number of pixels, such as white pixels, corresponding to the width are added from the end side corresponding to the non-home position.

The number of deleted or added pixels can be calculated by the formula: [(printing resolution)/(position correction resolution)]×[(printing resolution)/(image resolution)]. In this formula, the position correction resolution is expressed as a value by converting the unit (µm) of position correction amount into another unit dpi (Dot Per Inch). A calculation example using this formula is given below. For example, if the resolution of the combined image data is 1440 dpi, the printing resolution of the printer 10 is 2880 dpi, and the position correction amount is −70.50 µm, the number of pixels deleted in the width direction (main scanning direction) of the convex lens L11 is calculated as 16=(2880/(25.4/0.07050))×(2880/1440).

Subsequent to step S05, a color conversion process and a half-tone process are performed on the combined image data subjected to the phase correction (S06). In the color conversion process, color components represented by R, G and B systems, of the combined image data are converted into color components of cyan (C), magenta (M), yellow (Y) and black (K) systems which can be printed by the printer 10 and/or can be represented. Furthermore, a half-tone process is performed on the combined image data subjected to the color conversion. In the half-tone process, dot distribution processing is carried out by using a technique such as an error diffusing method or a dithering method.

Subsequently, an operation of generating print data executed starting from the image data subjected to the half-tone processing (S07). The print data include raster data indicative of a printing state of a dot in each main scanning and data indicative of an amount of feeding during sub scanning, and are created with reference to distribution data in a distribution table. The print data are mirror images inverted with respect to normal print data.

Subsequently, printing is executed based on the created print data (S08). Specifically, the created print data is output from the computer 130 to the printer 10, and in the printer 10, the sheet feeding motor 43, the sheet discharging motor 44, and the print head 51 are driven based on the print data. In this way, the print image based on the combined image data with the phase adjustment (position correction) reflected thereon is formed on the lens sheet L.

ADVANTAGE OF THE INVENTION

According to the above-described configuration, when the user inputs the visibility in the left and right eyes by moving the cursor 201 on the display window 200, the position correction amount for forming the print image on the lens sheet L is calculated based on the input visibility. Moreover, the printing is executed on the lens sheet L based on the combined image data and the position correction amount so that the position correction amount is reflected thereon. In this way, the print image with the position correction amount reflected thereon is printed on the lens sheet L. Therefore, it is possible to perform phase matching (position correction) between the convex lens L11 and the print image in a simple manner.

As illustrated in FIG. 3 and the like, in the test pattern L5, a plurality of color areas L6 with different colors is arranged in a predetermined order in one convex lens L11. Therefore, if a positional deviation occurs, one color may appear as different colors to the user's left and right eyes. Therefore, it is possible to perform phase matching (position correction) between the convex lens L11 and the print image in a simple manner based on the visibility of colors in the user's left and right eyes.

Moreover, in the present embodiment, the position correction amount is calculated based on the position correction amount table 134d as illustrated in FIG. 8. Therefore, it is possible to calculate the corresponding position correction amount from the visibility of colors in the user's left and right eyes in a simple manner.

Furthermore, in the present embodiment, the position correction amount table 134d may be configured such that the test pattern L5 is printed with the same arranged of the lens sheet L as the case of printing the print image with the printer 10. Therefore, the visibility of colors in the user's left and right eyes can be reflected as the position correction amount when the print image is printed, without requiring any processing. In addition, it is possible to decrease the amount of data required to be stored in the position correction amount table 134d.

Moreover, the combined image data may be corrected so that the number of pixels in the combined image data are added or deleted on the basis of the position correction amount calculated by the position correction amount table 134d. In this case, it is possible to perform phase matching (position correction) between the convex lens L11 and the print image in an accurate manner.

Furthermore, in the present embodiment, the lens sheet L has the print image-forming area L4b and the margin area L4a, and the tear-off line L7 is provided between them. Owing to such a configuration, the test pattern L5 can be torn off from the print image-forming area L4b because of the presence of the tear-off line L7. Therefore, after the phase matching (position correction) is completed, the margin area L4a with the unnecessary test pattern L5 formed thereon can be torn off.

Modifications

While exemplary embodiments of the invention have been described hereinabove, the invention can be modified in various ways. Such modifications will be described below.

Modification of Print Operation

Figure 9:
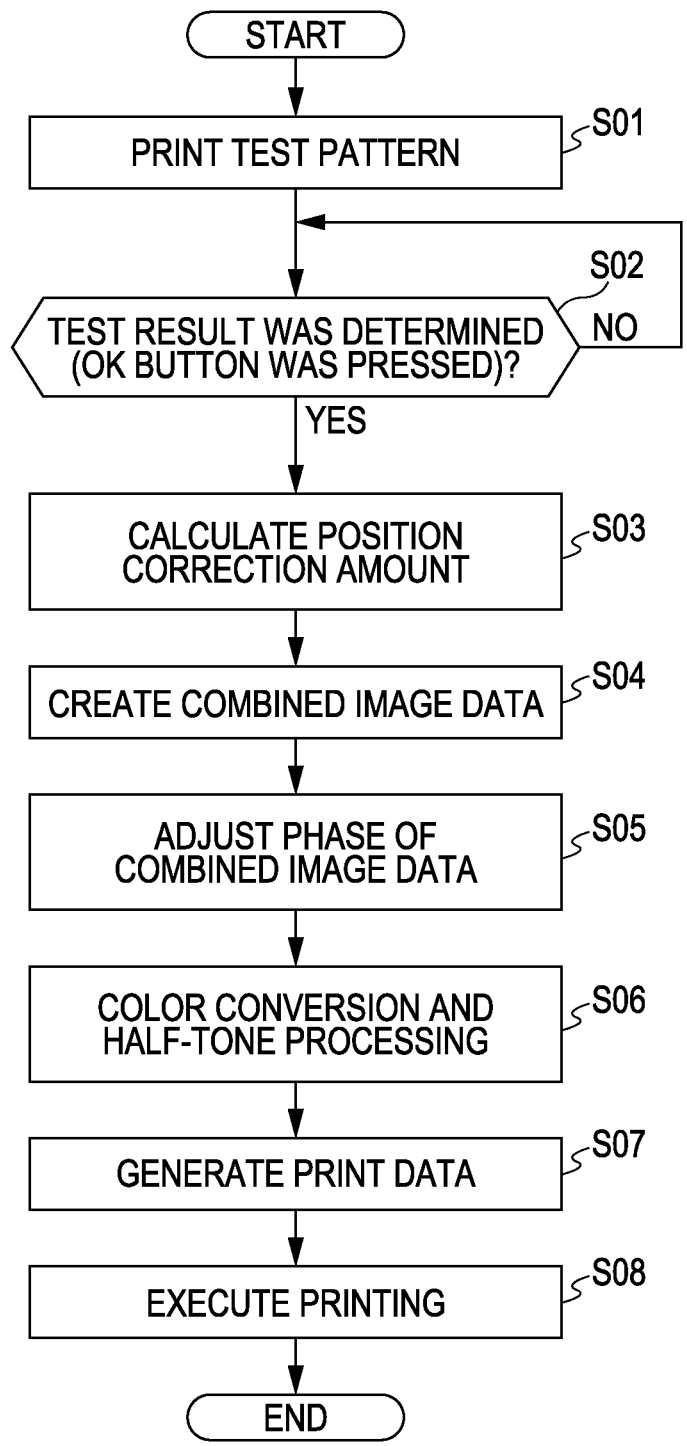
FIG. 9 is a flowchart illustrating the procedures in performing printing which reflects a position correction amount.
Figure 11:
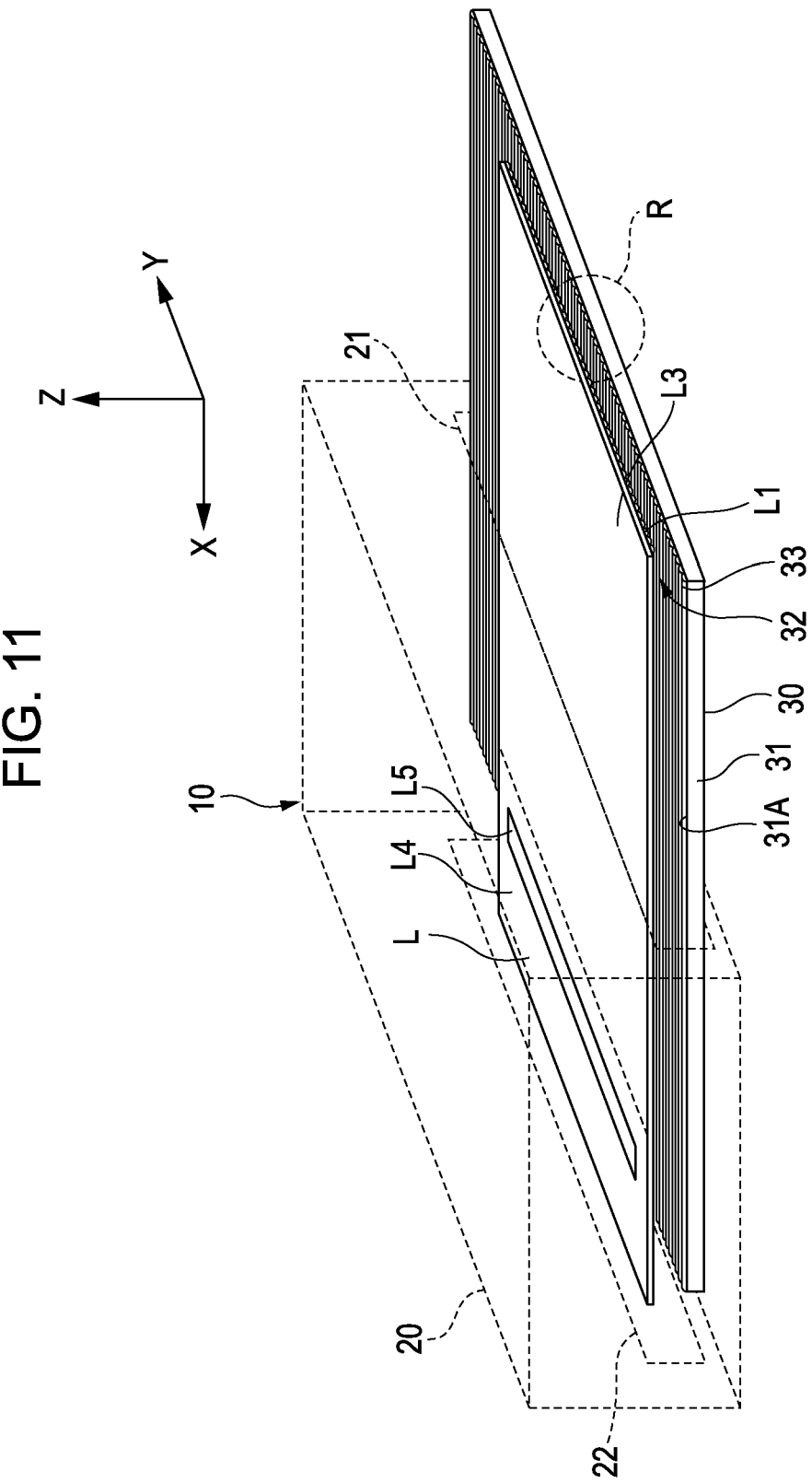
FIG. 11 is a perspective view illustrating a state where the lens sheet is set in a reverse direction.

In the processing flow illustrated in FIG. 9, as illustrated in FIG. 2, the printing of the test pattern L5 was performed in a state where the margin area L4a is positioned on the upstream side in the sheet feeding direction. To the contrary, as illustrated in FIG. 11, the printing of the test pattern L5b may be performed in a state where the margin area L4a is positioned on the downstream side in the sheet feeding direction.

When the printing is performed in the printing order of the color areas L6 illustrated in FIG. 3 with the margin area L4a being positioned on the downstream side in the sheet feeding direction, the colors are not arranged in the order of red (R), green (G), and blue (B) from the left side, but are arranged in the order of red (R), blue (B), and green (G). Therefore, in the case of the positioning in the margin area L4a on the downstream side, the printing order must be changed from that illustrated in FIG. 2. Therefore, a test pattern L5b in which colors are changed in the order of red (R), green (G), and blue (B) from the left side, as illustrated in FIG. 11, can be achieved.

Moreover, even when the margin area L4a is positioned on the downstream side in the sheet feeding direction (that is to say, the longitudinal direction of the lens sheet L is rotated by 180 degrees from that illustrated in FIG. 2), the side (non-home position side) from which the printing of the lens sheet L is started does not change. However, when the test pattern L5 is visually observed by the user, as illustrated in FIG. 3, the lens sheet L is disposed so that the margin area L4a (the test pattern L5) is positioned on the lower side (front side). Moreover, in the convex lenses L11 at opposite ends in the width direction of the lens sheet L, the cutting points of the lenses in the width direction are different.

Figure 12:
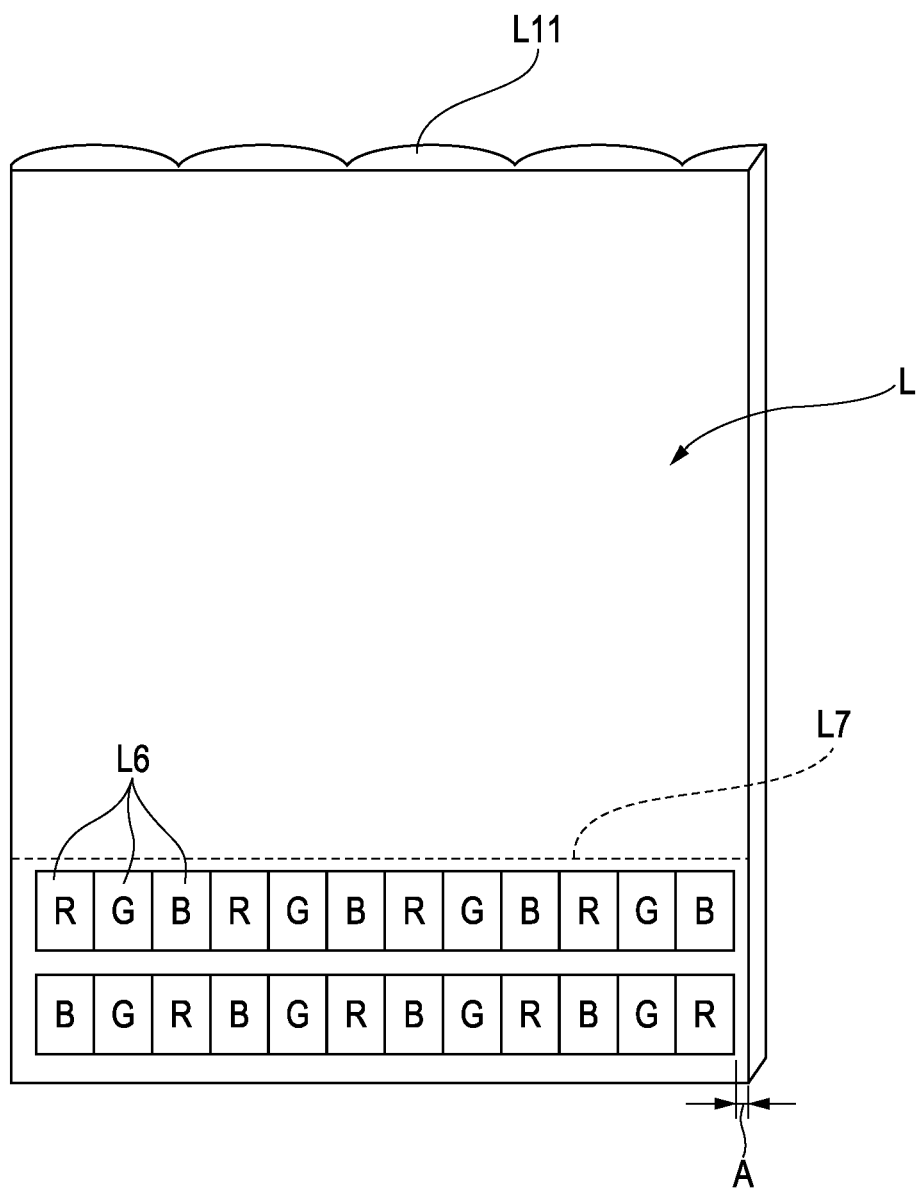
FIG. 12 is a diagram illustrating a state where two test patterns are printed.

In order to solve this problem, as illustrated in FIG. 12, two test patterns L5a and L5b are formed on the margin area L4a. Among these patterns, the test pattern L5a is printed from the right end of FIG. 12, for example, similar to the test pattern L5 illustrated in FIG. 3. The test pattern L5b is printed from the left end of FIG. 12. Since the two test patterns L5a and L5b are in one-to-one correspondence, a position correction amount table 134e as illustrated in FIG. 13 is created.

In the position correction amount table 134e, the correspondence of the visibility of colors between the state where the margin area L4a is positioned on the upstream side in the sheet feeding direction and the case where the margin area L4a is positioned on the downstream side in the sheet feeding direction. Moreover, the relationship between the correspondence of the visibility of colors and the position correction amount is also stored.

By creating the position correction amount table 134e as illustrated in FIG. 13, in subsequent printing of lens sheets L having the same width dimension (of the same lot), a user may only need to print the test pattern L5b with the margin area L4a being positioned on the downstream side, thereby being able to automatically calculate the position correction amount when forming the print image on the print area (i.e., the case of positioning the margin area L4a on the upstream side) from the correspondence table illustrated in FIG. 13.

Moreover, when the dimensional precision of the lens sheet L is very high, the relationship between the cutting position of the convex lens L11 at one end in the width direction and the cutting position of the convex lens L11 at the other end in the width is uniquely determined. Therefore, the cutting position of the convex lens L11 at one end in the width direction and the cutting position of the convex lens L11 at the other end in the width may be measured by preliminarily inspection, for example. By doing so, it becomes unnecessary to print two test patterns L5a and L5b on one lens sheet L, as described above. Moreover, the printing of the test pattern L5b can be performed while maintaining the state where the margin area L4a is positioned on the downstream side in the sheet feeding direction.

In the case of doing so, even when the dimensional precision of the lens sheet L is very high, the test pattern L5b is printed only once on the margin area L4a which is positioned on the downstream side. For this reason, the printing is performed on the print image-forming area L4b in the state of being pressed by the sheet feeding roller 40 or the sheet discharging roller 41, thereby making it possible to decrease the longitudinal dimension of the margin area L4a.

Furthermore, similar to the case of using the position correction amount table 134d, by using the position correction amount table 134e, it is possible to perform phase matching (position correction) between the convex lens L11 and the print image in an effective manner.

Other Modifications

Figure 14:
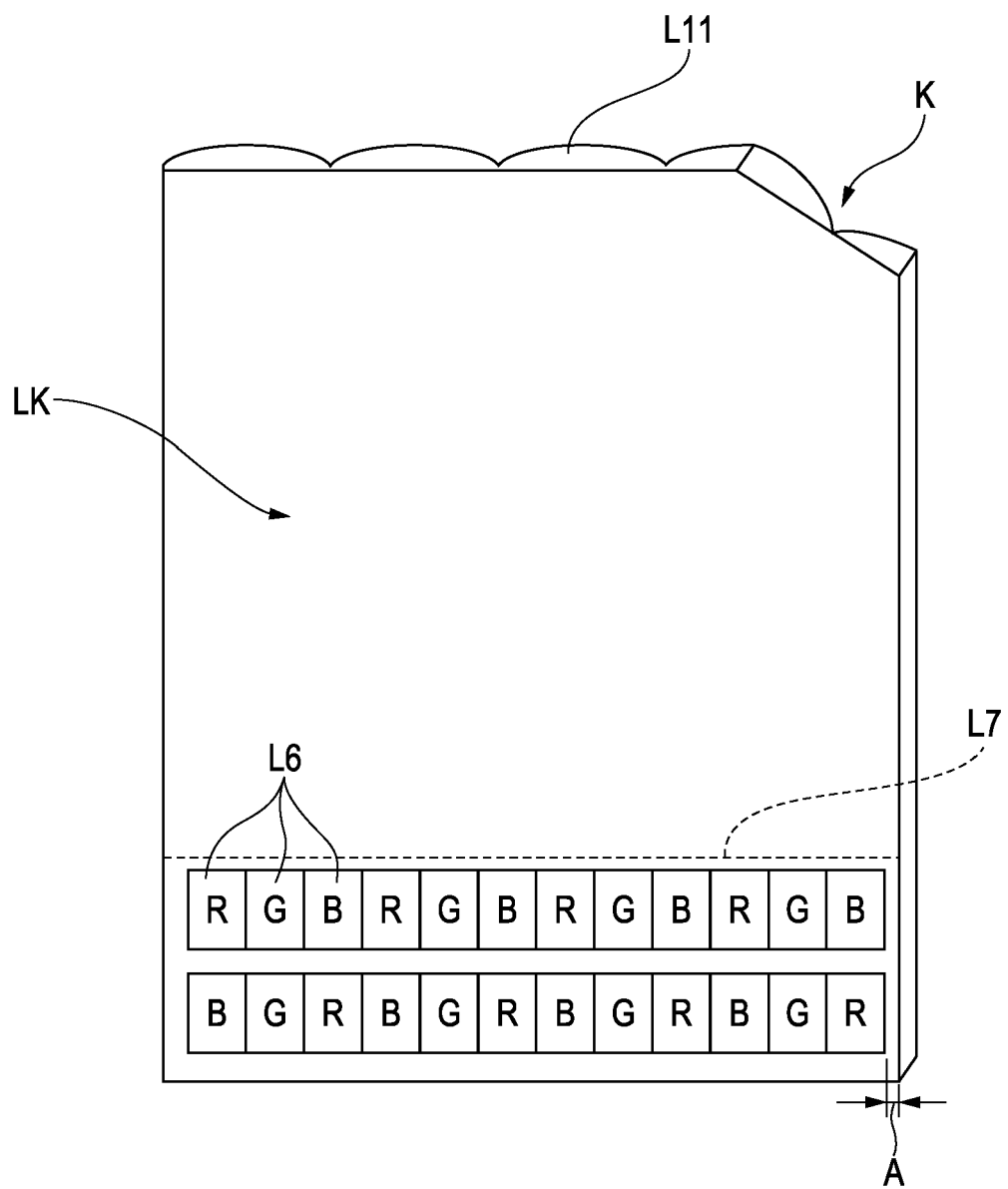
FIG. 14 is a plan view of the lens sheet provided with a cut-out portion.

As the lens sheet, in addition to the lens sheet L as illustrated in FIG. 3 and the like, a lens sheet Lk as illustrated in FIG. 14 may be used. In the lens sheet Lk illustrated in FIG. 14, a cut-out portion K (corresponding to identification means) for enabling the identification of the direction of the feeding of the lens sheet Lk is formed in a corner portion of the lens sheet Lk.

By doing so, the user can easily identify the direction of setting the lens sheet Lk. Therefore, because of the presence of the cut-out portion K, the user is prevented from setting the lens sheet Lk on the printer 10 in the wrong direction. As a result, it is possible to prevent the print image from being formed in the wrong direction and to prevent the waste of a lens sheet. Moreover, in the case of having the cut-out portion K, it is possible to immediately determine whether or not the lens sheet is set at the proper position by using a sheet detection sensor or the like mounted on the carriage 50, for example.

Figure 15:
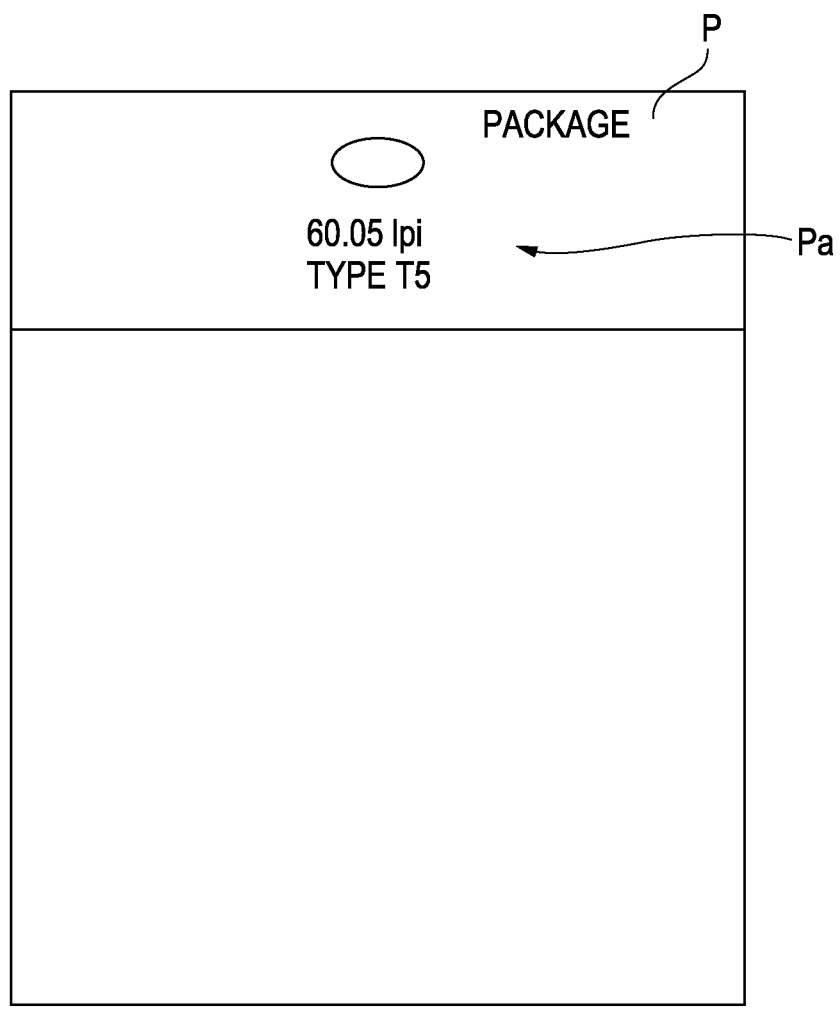
FIG. 15 is a diagram illustrating a package having information printed thereon.

As illustrated in FIG. 15, information Pa about the position correction amount, such as ID (e.g., T5) of the position correction amount table 134d in FIG. 8, may be printed on a package P storing therein the lens sheet. In this case, improved convenience can be provided to the user when the user inputs the information Pa described on the package P as the information on the position correction amount on another window different from that illustrated in FIG. 7.

In the above-described embodiment, the printer 10 is configured as a printer of such a type that the carriage 50 moves in the main scanning direction. However, the printer may be an XY printer in which the carriage is movable not only in the main scanning direction but also in the sub scanning direction.

In the above-described embodiment, the pattern where a set of colors red (R), green (G), and blue (B) is alternately repeated is illustrated as an example of the test pattern L5. However, the test pattern is not limited to such a pattern, but any pattern comprised of any combination of other colors may be used. Moreover, the test pattern is not limited to a pattern comprised of a set of three colors, but any pattern comprised of any set of any number of colors, no less than 2, may be used.

Moreover, the test pattern is not limited to the test pattern illustrated in FIG. 3 and the like, but a test pattern that differs on elements other than color (for example, mesh-like graphics, concentric graphics, and checkered pattern) are alternately repeated may be used.

Although in the above-described embodiment, the case where the printing apparatus 11 is configured to include the printer 10 and the computer 130, the printing apparatus 11 may be configured from only the printer 10.

What is claimed is:

1. A printing apparatus for performing printing on a lens sheet on which a plurality of lenses is arranged with a longitudinal direction thereof in one direction, and a print image corresponding to a plurality of parallaxes is formed on one surface thereof, wherein a test pattern configured to provide different visibility to a user's left and right eyes is formed on any portion of the lens sheet, with a longitudinal direction thereof being set in a direction crossing the one direction, the printing apparatus comprising:
    position correction amount-calculation means for calculating a position correction amount for forming the print image on the lens sheet based on the visibility of the test pattern;
    print execution means for executing printing in order to form the print image on the basis of the combined image data created from a plurality of original image data and the position correction amount so that the position correction amount is reflected in the print image; and
    combined image data creation means for creating the combined image data based on the plurality of original image data, whereby the combined image data creation means performs the adding or removing of pixels in the combined image data by the amount corresponding to the position correction amount calculated by the position correction amount-calculation means.

2. The printing apparatus according to claim 1, wherein the test pattern is configured such that a plurality of color areas with different colors is arranged in a predetermined order in one of the lenses.

3. A printing apparatus for performing printing on a lens sheet on which a plurality of lenses is arranged with a longitude direction thereof in one direction, and a print image corresponding to a plurality of parallaxes is formed on one surface thereof, wherein a test pattern configured to provide different visibility to a user's left and right eyes is formed on any portion on the lens sheet, with a longitudinal direction thereof being set in a direction crossing the one direction, the printing apparatus comprising:

position correction amount-calculation means for calculating a position correction amount for forming the print image on the lens sheet based on the visibility of the test pattern; and print execution means for executing printing in order to form the print image on the bases of the combined image data created from a plurality of original image data and the position correction amount so that the position correction amount is reflected in the print image, wherein the test pattern is configured such that a plurality of color areas with different colors is arranged in a predetermined order in one of the lenses, and wherein the position correction amount-calculation means includes a position correction amount table in which the visibility of colors measured in advance and the position correction amount are stored in a correlated manner, and calculates the position correction amount based on the position correction amount table.

4. The printing apparatus according to claim 3, wherein the lens sheet has a first print area for printing the print image thereon and a second print area for forming the test pattern thereon, and wherein the position correction amount-calculation means causes the test pattern to be printed on the second print area in a state where the second print area is positioned closer to the upstream side in the direction of the feeding of the lens sheet than the first print area, which is the state identical to the arrangement where the print image is printed on the first print area.

5. The printing apparatus according to claim 3, wherein the lens sheet has a first print area for printing the print image thereon and a second print area for forming the test pattern thereon, and wherein the position correction amount-calculation means causes the test pattern to be printed on the second print area in a state where the second print area is positioned closer to the downstream side in the direction of the feeding of the lens sheet than the first print area, which is the state different from the arrangement where the print image is printed on the first print area.

6. The printing apparatus according to claim 5, wherein the position correction amount table stores the state where the test pattern is printed in the state where the second print area is positioned closer to the upstream side in the direction of feeding the lens sheet than the first print area and the state where the test pattern is printed in the state where the second print area is positioned closer to the downstream side in the direction of feeding the lens sheet than the first print area, in a correlated manner.

7. A lens sheet comprising:

a first print area on which a plurality of lenses is arranged with a longitudinal direction thereof in one direction, and a print image corresponding to a plurality of parallaxes is formed on one surface thereof;

a second print area on which the plurality of lenses is arranged to be continuous to the first print area, and a test pattern configured to provide different visibility to a user's left and right eyes is formed; and a tear-off line provided along the boundary of the first print area and the second print area so as to tear off the second print area from the first print area, wherein identification means for enabling the identification of the direction of the feeding of the lens sheet is formed in the first print area of the second print area.

8. A printing method for performing printing using a printer on a lens sheet on which a plurality of lenses is arranged with a longitudinal direction thereof in one direction, and a print image corresponding to a plurality of parallaxes is formed on one surface thereof, wherein a test pattern configured to provide different visibility to a user's left and right eyes is formed on a predetermined portion of the lens sheet, with a longitudinal direction thereof in a direction crossing the one direction, the printing method comprising:

calculating a position correction amount for forming the print image on the lens sheet based on the visibility of the test pattern;

creating combined image data in order to forming the print image based on a plurality of original image data;

executing printing in order to form the print image based on the combined image data and the position correction amount so that the position correction amount is reflected in the print image;

creating the combined image data based on the plurality of original image data; and performing the adding or removing of pixels in the combined image data by the amount corresponding to the calculated position correction amount.

* * * * *